United States Patent
Ridihalgh et al.

(10) Patent No.: US 9,448,762 B2
(45) Date of Patent: Sep. 20, 2016

(54) PRECOGNITIVE INTERACTIVE MUSIC SYSTEM

(71) Applicant: Microsoft Technology Licensing, LLC, Redmond, WA (US)

(72) Inventors: Robert Lucas Ridihalgh, Seattle, WA (US); Paul D. Lipson, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 14/320,193

(22) Filed: Jun. 30, 2014

(65) Prior Publication Data

US 2015/0378667 A1    Dec. 31, 2015

(51) Int. Cl.
*G06F 3/0481* (2013.01)
*G06F 3/16* (2006.01)
(Continued)

(52) U.S. Cl.
CPC .............. *G06F 3/165* (2013.01); *A63F 13/54* (2014.09); *A63F 13/573* (2014.09); *A63F 13/60* (2014.09); *G06F 3/0482* (2013.01); *G06F 3/04842* (2013.01); *G06F 3/04847* (2013.01); *G06F 17/30752* (2013.01); *G10H 1/0025* (2013.01); *G11B 27/02* (2013.01); *G11B 27/034* (2013.01); *G11B 27/28* (2013.01);
(Continued)

(58) Field of Classification Search
CPC ....................................................... G06F 3/163
USPC ........................................................ 715/716
See application file for complete search history.

(56) References Cited

U.S. PATENT DOCUMENTS 5,394,332 A * 2/1995 Kuwahara .......... G01C 21/3629
                                                340/988
7,674,966 B1 * 3/2010 Pierce ................... G10H 1/0025
                                                84/609

(Continued)

FOREIGN PATENT DOCUMENTS

EP    1956586 A2    8/2008
EP    1973114 A1    9/2008

(Continued)

OTHER PUBLICATIONS

Karen Collins, "An introduction to Procedural Music in Video Games", In Proceedings of Contemporary Music Review, vol. 28, No. 1, Feb. 1, 2009, 10 pages.*

(Continued)

*Primary Examiner* — Reza Nabi
(74) *Attorney, Agent, or Firm* — Aaron Chatterjee; Judy Yee; Micky Minhas

(57) ABSTRACT

The subject disclosure is directed towards a pre-cognitive interactive music system that dynamically generates and adjusts music based on a user's interactions with a videogame or other interactive system. When a user is predicted as getting close to an upcoming event, audio clips are dynamically selected (e.g., via metric modulation) based upon an estimated time to reach the event. The audio clips are stitched together and played as prelap music as the user approaches the event, and the clips may be varied if the estimated time changes due to user interaction. Drawdown music is similarly selected as the user completes or moves away from an event. Also described is the changing of the playing rate to adjust the music, and the use of harmonic modulation to change the music's key over time to increase or lower perceived suspense as the user approaches the event or moves away from it, respectively.

20 Claims, 9 Drawing Sheets

(51) Int. Cl.

| | |
|---|---|
| *G06F 17/30* | (2006.01) |
| *G06F 3/0484* | (2013.01) |
| *G06F 3/0482* | (2013.01) |
| *G11B 27/034* | (2006.01) |
| *G11B 27/28* | (2006.01) |
| *G10H 1/00* | (2006.01) |
| *G11B 27/02* | (2006.01) |
| *A63F 13/60* | (2014.01) |
| *A63F 13/573* | (2014.01) |
| *A63F 13/54* | (2014.01) |

(52) U.S. Cl.
CPC . *G10H 2210/026* (2013.01); *G10H 2210/101* (2013.01); *G10H 2210/105* (2013.01); *G10H 2210/125* (2013.01); *G10H 2210/151* (2013.01); *G10H 2210/361* (2013.01); *G10H 2210/391* (2013.01); *G10H 2240/085* (2013.01); *G10H 2240/131* (2013.01); *G10H 2250/015* (2013.01)

(56) References Cited

U.S. PATENT DOCUMENTS

| | | | | |
|---|---|---|---|---|
| 2006/0287037 | A1* | 12/2006 | Thomas | G07F 17/3202 463/16 |
| 2007/0185909 | A1* | 8/2007 | Klein | A63F 13/10 |
| 2011/0010321 | A1* | 1/2011 | Pachet | G06N 99/005 706/12 |
| 2014/0039684 | A1* | 2/2014 | Van De Sluis | H05B 37/029 700/275 |
| 2014/0171195 | A1* | 6/2014 | Searchfield | A63F 9/0001 463/31 |
| 2015/0378667 | A1* | 12/2015 | Ridihalgh | G06F 3/165 715/716 |
| 2015/0382128 | A1* | 12/2015 | Ridihalgh | H04S 7/301 381/57 |

FOREIGN PATENT DOCUMENTS

| | | |
|---|---|---|
| WO | 2008052009 A2 | 5/2008 |
| WO | 2012123780 A1 | 9/2012 |

OTHER PUBLICATIONS

Peter Peerdeman, "Sound and Music in Games" avaliable at [http://www.peterpeerdeman.nl/vu/ls/peerdeman_sound_and_music_in_games.pdf], Apr. 2010, 17 pages.*

Second Written Opinion Issued in PCT Application No. PCT/US2015/038214, Mailed Date: Mar. 21, 2016, 9 Pages.

Collins, Karen, "An Introduction to Procedural Music in Video Games", In Proceedings of Contemporary Music Review, vol. 28, No. 1, Feb. 1, 2009, 10 Pages.

International Search Report and Written Opinion Issued in PCT Application No. PCT/US2015/038214, Mailed Date: Sep. 29, 2015, 16 Pages.

* cited by examiner

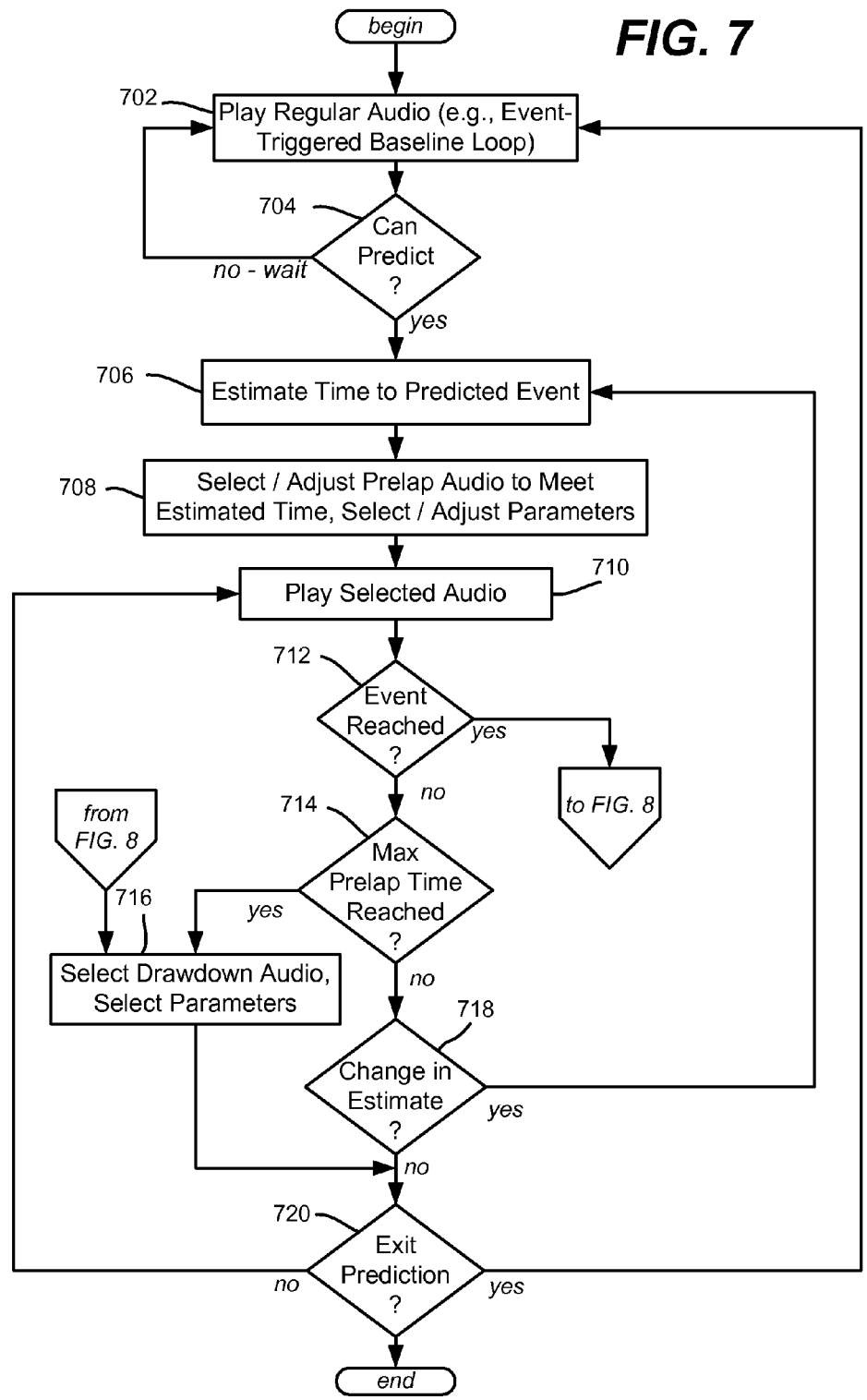

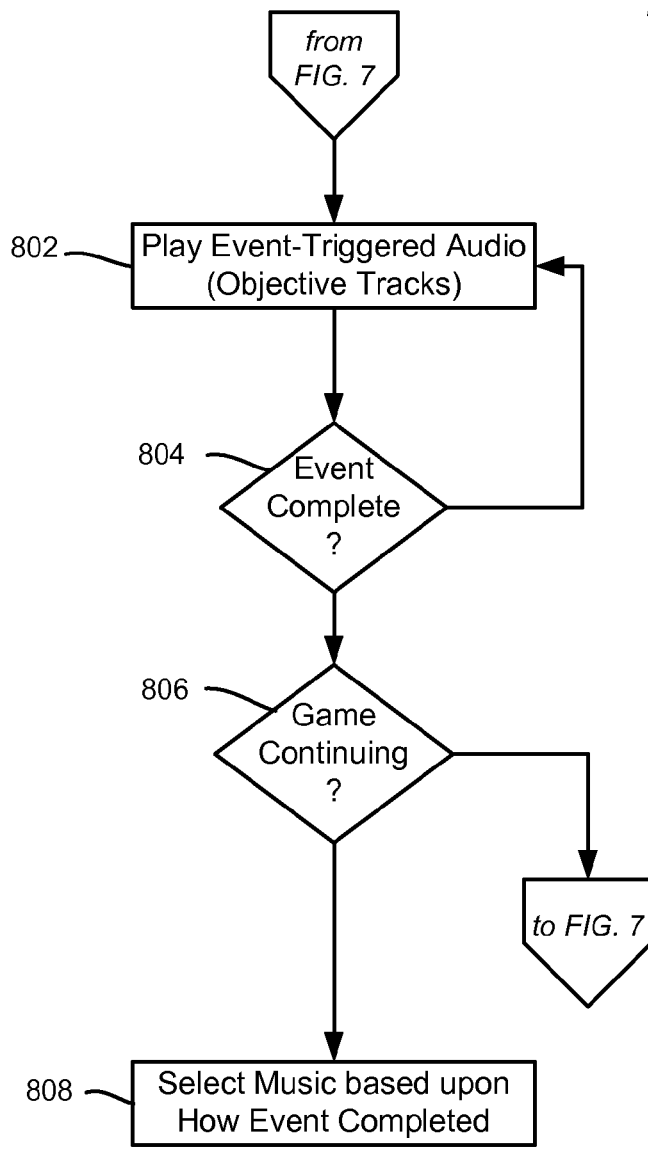

PRECOGNITIVE INTERACTIVE MUSIC SYSTEM

BACKGROUND

Movies and television shows have long used music to enhance the audience's overall experience. The composer or arranger of the musical score, who has a full linear view of the entire story ahead of time, is able to fit the music to the current scene through experience and by working with the director. Careful post-production scoring is used to affect the audience's emotions, foreshadow danger, enliven an action scene, suggest that a character is evil or sinister (often before the character's true nature is revealed), build a sense of dread, delight, and spectacle through tension and release, anticipation and resolution and so on.

Unlike scripted content, however, the composer or arranger of the music for a videogame does not have the benefit of knowing what is going to occur next, at least not for the most part. This is because videogames are not pre-scripted static content but rather are based upon unpredictable player input. For example, an adventure game player may choose to enter into a dangerous environment or skip over it; a player of a warfare videogame may choose to enter into battle or not. As a result, contemporary videogame music reacts to user-decided events.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a dynamic music generation processing component configured to select audio clips based upon current context data corresponding to an interactive user, including to estimate an estimated time to an upcoming event and select the audio clips based upon the estimated time to the upcoming event.

One or more aspects are directed towards dynamically generating prelap music as an interactive user approaches an upcoming event, including determining an estimated time to reaching the event and selecting a length of the prelap music to approximate or meet the estimated time. Also described is dynamically generating drawdown music as an interactive user moves away from the upcoming event or has reached and completed the event.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 7 is a flow diagram representing example steps of that may be used in dynamic music generation and adjustment, according to one or more example implementations.

FIG. 8 is a flow diagram representing example steps of that may be used when a user reaches an event, according to one or more example implementations.

DETAILED DESCRIPTION

Figure 1:
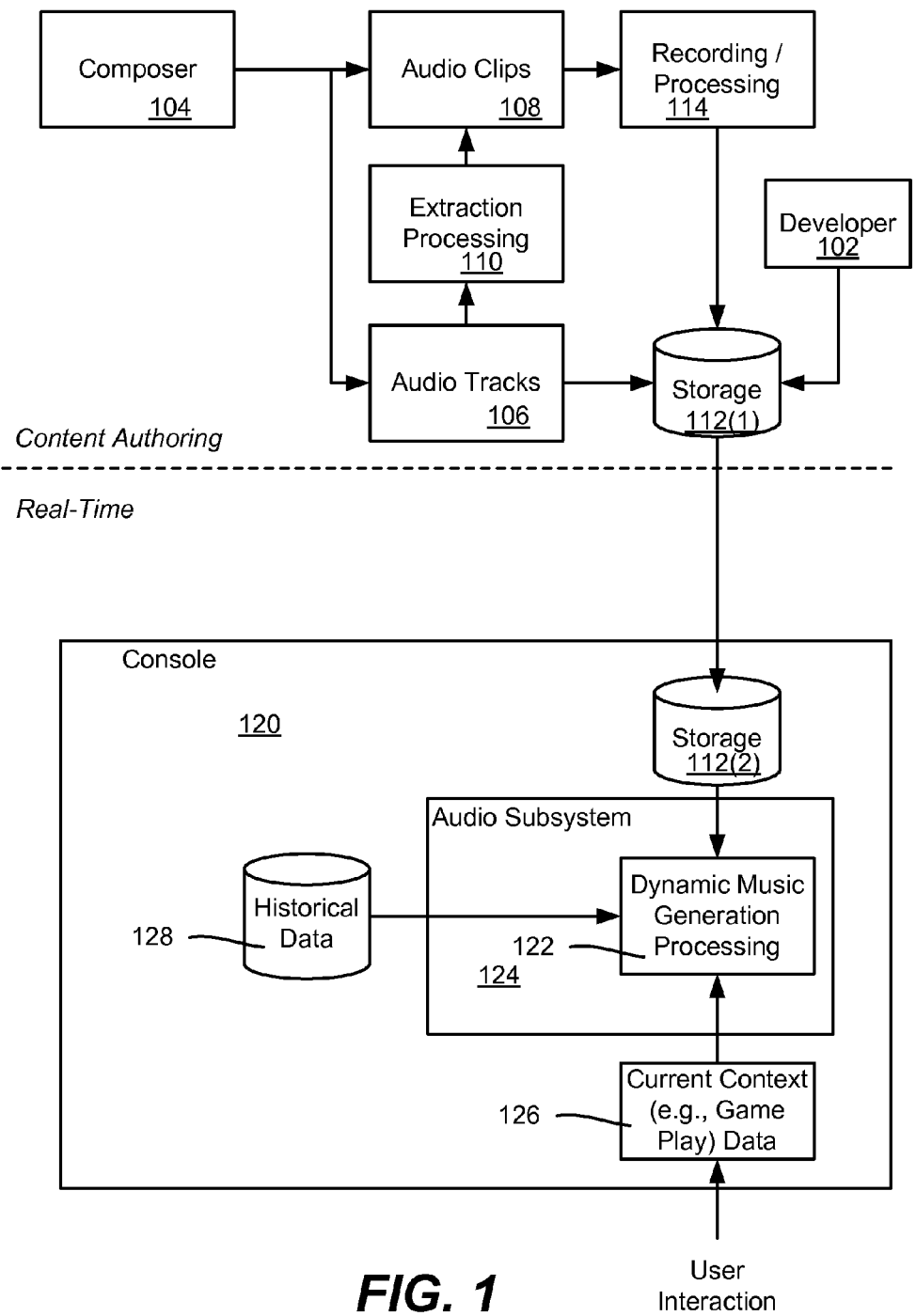
FIG. 1 is an example block diagram representing example components of a precognitive interactive music system according to one or more example implementations.

Various aspects of the technology described herein are generally directed towards an interactive music system that enables music precognition at runtime. Instead of reacting to an event to change the music, the technology predicts an interactive user's likely actions and proactively adjusts the music based upon the prediction. In this way, for example, upcoming possible events in an interactive videogame may be foreshadowed, whereby the character and interaction seem more like a movie from an auditory stand-point. Note that for purposes of consistency, the term "user" is generally used hereinafter to represent the interactive game player as well as other concepts, e.g., a "user" may be referring to a game character (e.g., the "user's health" actually means the "character's health") or some other entity (e.g., a car) under the user's control.

In one aspect, a user's time to an upcoming event is estimated in real time, such as based upon the speed and direction of the user, or other real time data, such as the health of the user (the character's health that is) or other players. "Prelap" (generally foreshadowing) music in the form of audio clips (corresponding to measures or other segments) are dynamically selected, possibly randomly, to meet the estimated time, e.g., via metric modulation. The dynamic selection also may include other parameters, such as harmonic modulation to change the music's key, possibly over the estimated time, e.g., to heighten tension.

If the predicted time to the event varies from the original estimate, changes may be made to more closely adjust the music to the new estimate. For example, the tempo (beats per minute, or bpm) may be increased or decreased to stretch or compress the total playback time. Segments may be added, replaced, and/or dropped to meet a new time estimate.

If the user decides to move away from the event, the music may change, such as to reduce tension. This may be accomplished by the processing dynamically generating/ selecting an entirely new "drawdown" set of audio clips, and/or by changing the parameters. If the user takes too long to reach the event, the music may be dynamically changed to drawdown music.

If the user does reach the event, the music again may change, as can the music when the user completes the event. Transitions such as to a new level, to show results, and so forth also may be accompanied by music. Any of the music that is played may be dynamically generated, however the technology allows for static (e.g., conventional event-driven) music to be used at certain times.

It should be understood that any of the examples herein are non-limiting. For instance, some of the example description and drawings primarily show a gaming and entertainment system, however other interactive devices such as a personal computer, exercise device and the like may benefit from the technology described herein. Further, the technology is exemplified with respect to music, however the technology also may be used with other audio instead of or in addition to music, such as special effects, noises, tones and so forth that are not ordinarily considered as being "music." Still further, users also may enjoy the technology applied to haptic, visible or other sensory feedback, e.g., hearing impaired users may receive a similar precognitive experience. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in audio, gaming and computing in general.

FIG. 1 shows an example of how the technology may be implemented, beginning at development time where a game developer 102 (or team) and composer 104 work together to plan for precognitive interactive music. In general, the developer 102 defines events that may be reached during interactive game play, and sets prediction criteria. Any of various events that are reachable may be defined according to the type of game being played; e.g., one event may correspond to a destination such as a door in an adventure videogame that when opened triggers the event, another event in a racing game may be reaching the finish line, and so on. Other defined events may include the strength of a player in a fighting game, the strength of his or her enemy (or enemies), the total number of players (e.g., soldiers) on the user's team versus the other team, and so on. Essentially any state/condition in a game that can be reached and that the developer can define may be an event.

Example prediction criteria include concepts such as a distance or time that makes it likely that the user is intending to reach the event (e.g., the door, or some number of laps/other distance to the finish line). Other examples include relative strength (whether the user seems to be getting sufficiently close to possibly winning or losing a battle), and so on. Essentially anything that can predict the likelihood of a defined event occurring can be used as prediction criteria. Note that constraints may be used by the developer, or even in the real time processing, e.g., a person can only run so fast, so the developer and/or system can compute that it will take at least some pre-determinable time to reach a target.

The composer 104 writes the music (audio tracks 106) that will accompany the game play. Historically such music has been reactive and often would change upon reaching the event. In order to facilitate dynamic music generation that is precognitive as described herein, the composer 104 also can write audio clips 108 (e.g., individual measures of music with different time/meter signatures) that are intended to be dynamically stitched together during game play. Note that inconsistent meter in music can have a desired "jarring" effect on a listener, and thus the composer and developer may specify certain length clips be combined. Tools or the like also may be provided to extract (block 110) such audio clips from longer pieces of music, e.g., from the audio tracks.

The audio clips 108 may be stored as is in storage 112(a) and/or further processed (block 114) for storage. For example, the composer 104 may write or extract a single audio clip that is recorded (or processed) into audio clips in the key of C, C#, D, and so on, for use during game play as described below. A relatively large number of audio clips thus may be available for dynamic selection and generation. As can be readily appreciated, the stored audio and gaming code may be distributed with game media, downloaded, and so forth.

With respect to real time operation (e.g., in a console 120), dynamic generation processing 122, shown in an audio subsystem 124, uses the stored audio (clips and tracks) by selecting audio based upon the user's current context 126 (current game play data), and possibly historical data 128. For example, current game play data may indicate that based upon a user's location, rate of speed and direction, a user is five seconds away from possibly reaching a defined event, which the developer has defined as a threshold time to dynamically generate music, e.g., to increase tension as the user gets closer. Current context data 126 can include past accomplishments (the user already opened that trunk or knows what was behind the door) that indicate that building tension may not be desirable.

Other historical data 128 also may be used, e.g., to vary the current context, and/or resolve conflicting events. For example, a certain user may be within range of two (or more) defined events, but historically the user bypasses one event and goes towards the other, e.g., skips the closer door and goes to the further door. Thus, the history can be used as an indicator to build suspense as the user gets closer to the further door rather than the closer door.

Figure 2:
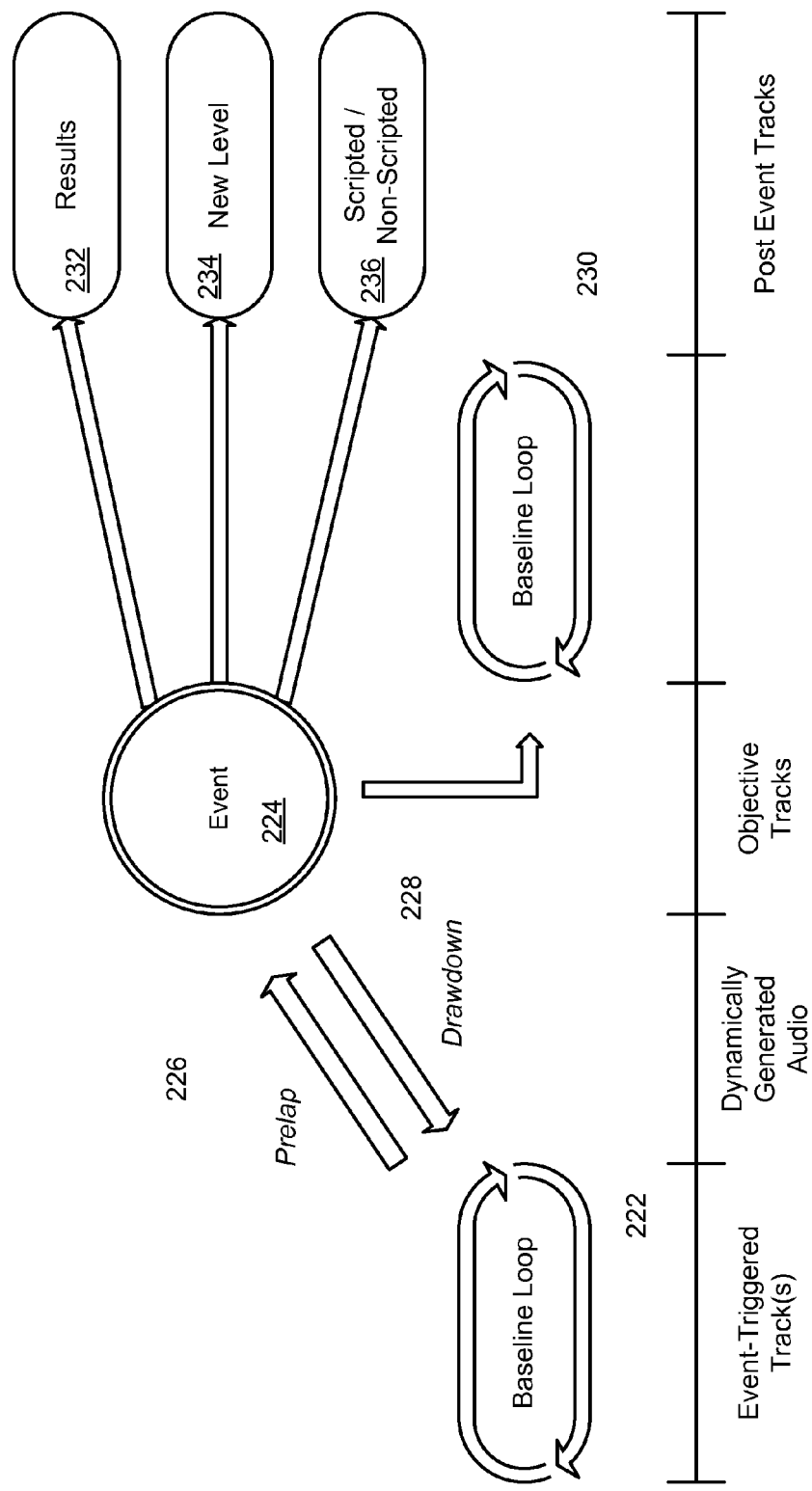
FIG. 2 is a representation of how music is dynamically changed over time based upon prediction of an upcoming event to provide a precognitive interactive music system, as well as changed upon later reaching the event, according to one or more example implementations.

Turning to dynamic generation of the music, FIG. 2 shows a dataflow type diagram in which audio is being played in a baseline loop 222. Such event-triggered tracks may be those conventionally used, but also may be dynamically generated as described herein, at least to an extent, e.g., with some random selection to vary the user experience.

At a certain time during play, the user will meet prediction criteria relative to a defined event 224, e.g., the user is within a threshold distance. At this time, the dynamic generation processing 122 (FIG. 1) computes an estimated time to the event ("time-to-target"), and selects audio clips that will meet the estimated time for prelap music 226 to build suspense. For example, if the developer has specified that when a user enters into a threshold distance from an event e.g., the user has moved from point A to point B in FIG. 3, dynamic generation processing computes that at the current speed and direction of the user, N (e.g., six) seconds of prelap music are needed. The dynamic generation processing then selects audio clips to meet the six second prelap time, based upon a 120 bpm playing rate, for example, as the length of each measure is known. In the event that the audio clips do not exactly match the estimated time, the playing rate may be adjusted to stretch or compress the estimated time to more closely approximate or even match the estimated time.

The selection of which audio clips are used need not be static, but can be random, at least to an extent. For example, randomly selected audio clips may be selected based upon their time/meter signatures such that that when stitched together, the clips meet the six second time estimate. Note that as used herein, the term "meet" or "match" with respect to the estimated time does not have be exact, however the closer the estimated time is approximated, the more that the buildup seems climactic and the drawdown seems anticlimactic.

The developer/composer may specify that clips be randomly selected to meet the time, but with different meter to provide an effect, e.g., instead of 4/4, 4/4 and 4/4, a preference may be specified to not select the same meter. Further, to build suspense, instead of being fully random, the developer and composer may want an audio clip played in a certain key, or start with one key and then increase over time to use at least one higher key to build up the suspense even more as the user gets closer to the event. Notwithstanding, the key or keys for playing the clip or clips may have a random component to their selection as well.

Figure 3:
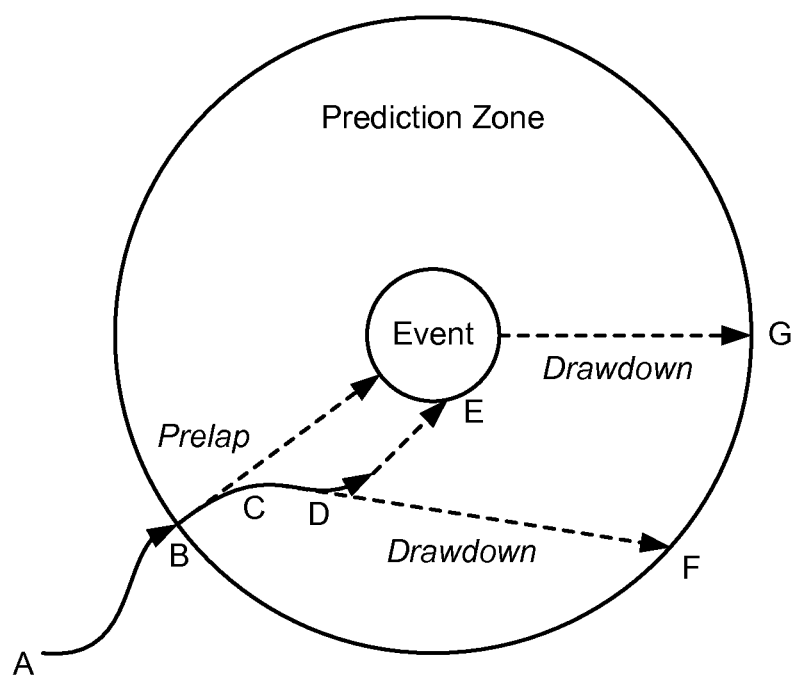
FIG. 3 is a representation of how a user may move unpredictably towards or away from an event to cause generation of prelap music or drawdown music, according to one or more example implementations.

Because the game is interactive, the estimated time-to-target may change and is thus recomputed in real time. For example, a user may slow down or speed up a character/vehicle, in which event the remaining time-to-target needs to be increased or decreased, respectively. A user also may veer off of the more direct path, as shown in FIG. 3 by the user moving to point C. If the event corresponds to encountering another player, the event location also may move. Various ways to compress or expand the audio time are described below, but in general include changing the beats-per-minute, and/or adding, removing or replacing selected audio clips.

Another possibility is that a user may retreat or otherwise move away from the event 224. In such a situation, the music may be varied via parameters to reduce suspense, or significantly changed to another set of audio clips comprising drawdown music 228. For example, in FIG. 3, the user may move from point C to point F. The user also may cause drawdown music to play by not reaching the event within a threshold maximum time.

The user also may reach the event 224 (e.g., from point C to D to E in FIG. 3), which as shown in FIG. 2, may change the music to another baseline loop 230 more appropriate for the event. For example, high-energy combat music may be played while the user has reached a "fight" event and is competing in the fight. Again, some or all of the music during the event may be dynamically generated, and this music may change during the event, e.g., as the opponent's character gets weaker.

The event 224 may end in any number of ways; for example, if a user retreats or wins, the user may go back to doing something less action-packed (e.g., play continues to point G in FIG. 3). Such a situation may dynamically select/generate drawdown music. This can change to prelap music if the user turns around and goes back towards the event. Note that the illustrated prelap prediction "zone" (which may be a geographical zone, but not necessarily, as it can be something else like an amount of health) for reaching the event need not be the same as the drawdown prediction "zone" for going away from the event. Further note that leaving a zone may be considered an event.

It is also possible that the event is completed in a way that switches from game play to showing results 232, such as if the user died in combat during the event. The user may have been promoted to a new level 234, or other scripted/non-scripted 236 actions may be taken. Post-event tracks may be selected for each of these, typically static music, but optionally dynamically generated as described herein.

Thus, as can be seen in FIG. 2, a baseline loop phase (e.g., the current state of the art of interact music) allows for an interactive state and event-based system that mixes between layers of music. The prelap phase (typically) puts energy in front of the event. The system dynamically builds up to an event that is no longer constrained by any amount of time, but rather can be dynamically scored to the estimated amount of time of the event. An input of time, the measurements already provided by/available from existing static technology may be used; however, unlike static movies, in interactive games, there is no control over the length of that time.

When the (apex) event is reached in a third phase, the system moves seamlessly between the prelap event and the apex event. Further, the prelap event technology may be used in a fourth, drawdown phase to basically perform the calculations in reverse and draw down to the basic state of the music, e.g., the baseline loop 222. Like the prelap event, dynamic pieces of music are constructed as there is no control over the length of time to go back.

The combination of the four phases may be used to create a pre-cognitive interactive music system.

Figure 4:
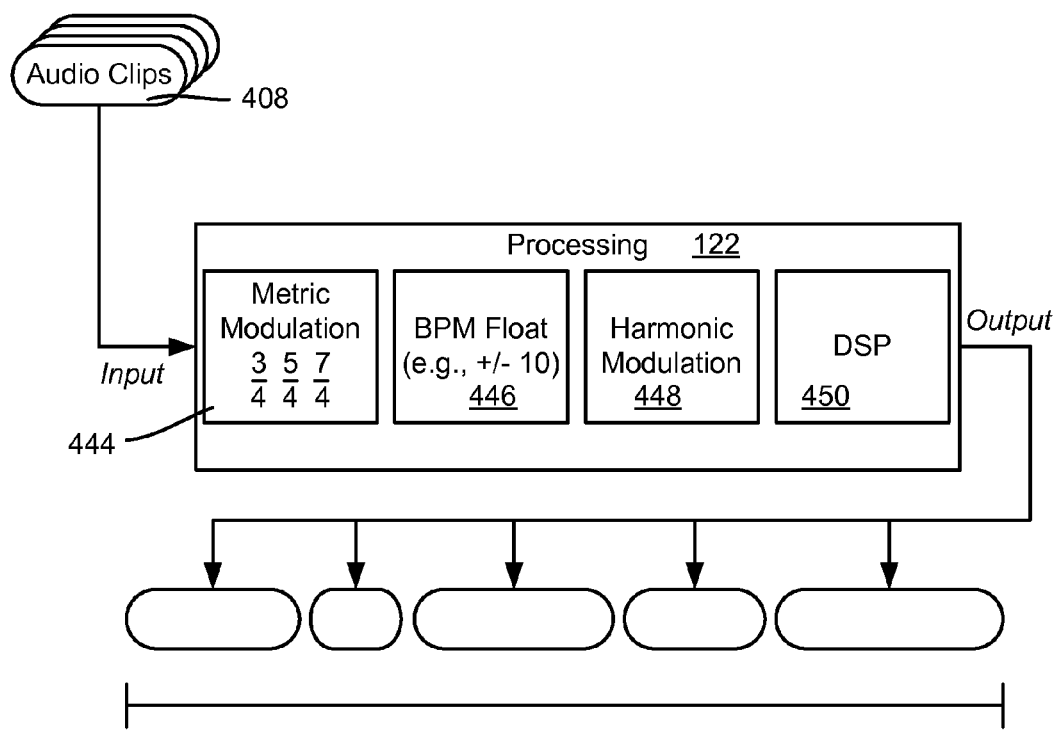
FIG. 4 is a representation of components of a dynamic music generation processing component that provides a precognitive interactive music system, according to one or more example implementations.

As represented in FIG. 4, a number of variables may be combined to generate a run-time pre-cognition system, including metric modulation 444, bpm float 446 and harmonic modulation 448. Additional variables include any suitable digital signal processing 450, e.g., increase volume, change equalization, change a filter, open or close an envelope, use effects such as reverb, and so forth.

In one aspect, the pre-cognition generation and adjustment may be made using some or all of the variables together. Music always has a start and end-point and it is always moving forward; as described above, there is an input source comprising a series of pre-authored audio clips 408 that match the authoring requirements. A first variable that may be used in the processing 112 is the metric modulation 444 of basic beats. To increase the amount of music, multiple beats are needed. The audio clips, created offline, are broken down into discrete pieces of varying length, which are assembled and collated at run-time. This allows controlling the overall length of the music piece by combining and inserting basic beats.

Second, beats per minute (bpm) floats 446 may be used. The bpm floats technique allows using a float between approximately +/−10 bpm before the music sounds unusual to the human ear. This allows the music beat described above to be played at varying speeds, and thus may be used for fine tuning of the music's length. Note that instead of a fixed range such as +/−10 bpm variation, a percentage of the base bpm may be used.

Another concept is of harmonic modulation 448, were the system changes the "key" of the music. For example, in prelap, the system may modulate upward in increments, such as with each increment being a half-step. Drawdown may modulate downward. This allows adjusting the feel of the energy of the music, to help build-up or draw down the music.

Figure 5A:
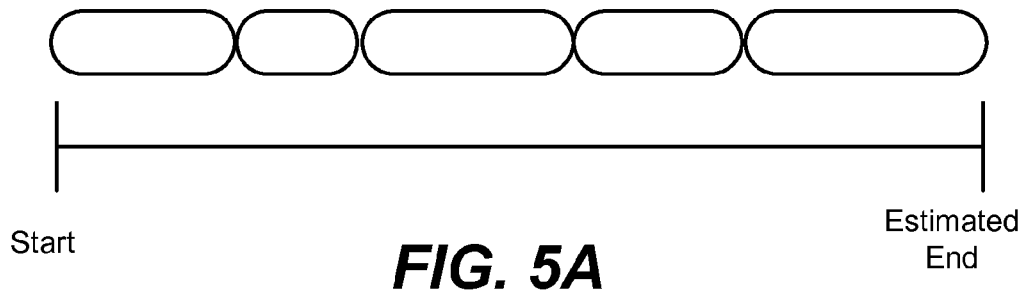
FIGS. 5A-5C are representations of how the length of dynamically generated music may be shortened as an estimated time to an event is recomputed, according to one or more example implementations.
Figure 5B:
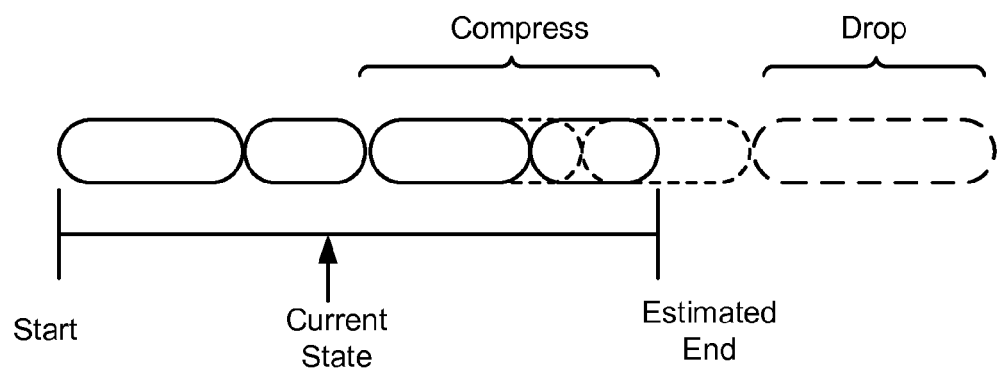
Figure 5C:
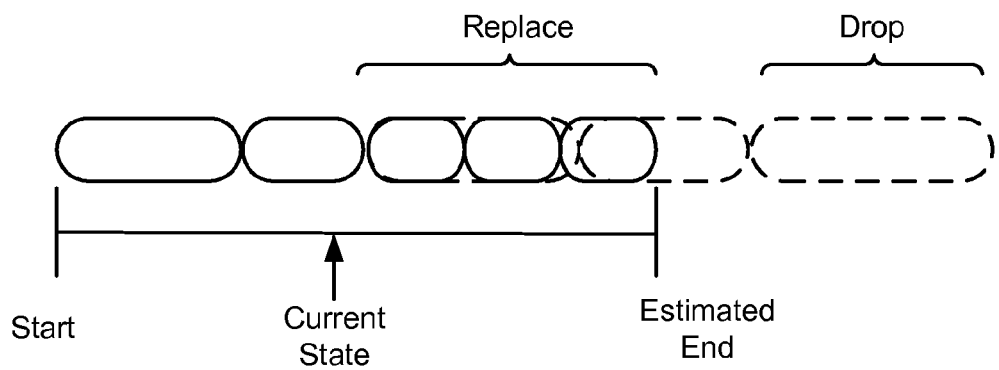

As described above, other digital signal processing 450 may be performed. The output, shown in FIG. 4 as the varied-sized ovals to represent the (possibly) different length audio clips, may be based upon a combination of one or more of the above-described concepts FIGS. 5A-5C show the concept of dynamically adjusting the prelap or drawdown to decrease the estimated time as user interaction changes it. For example, consider that FIG.

5A shows (via the ovals) the selected clips that are stitched together to form a prelap or drawdown piece of music.

In FIG. 5B, the user has reached a current state relative to the target (e.g., the event) but has just sped up, such as a race car getting close to passing another car, because the user has accelerated. The re-estimated time is thus shorter than in FIG. 5A. In FIG. 5B, the remaining audio clips may be compressed by increasing the bpm and thus making them shorter in actual time. However, doing so is still not sufficient in this example, so one of the selected clips is simply dropped.

Another option is shown in FIG. 5C, where the remaining audio clips are simply replaced with shorter ones. This allows for changing the harmonic modulation as well. As can be readily appreciated, replacement, compression and dropping of clips may be used alone or together to shorten the time as needed.

Figure 6A:
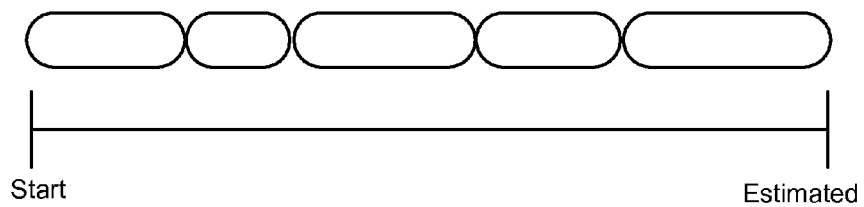
FIGS. 6A-6C are representations of how the length of dynamically generated music may be increased as an estimated time to an event is recomputed, according to one or more example implementations.
Figure 6B:
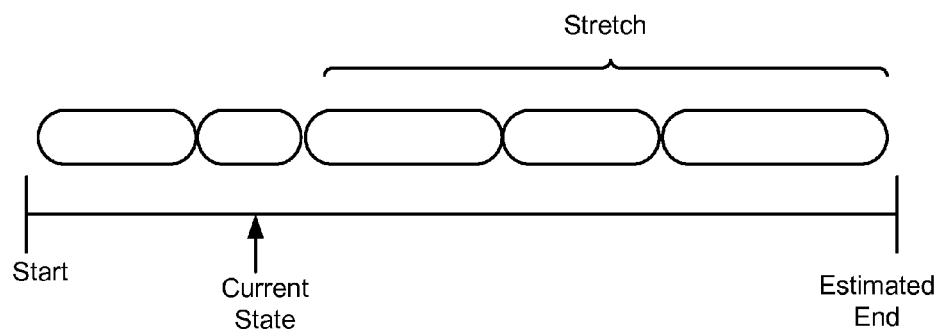
Figure 6C:
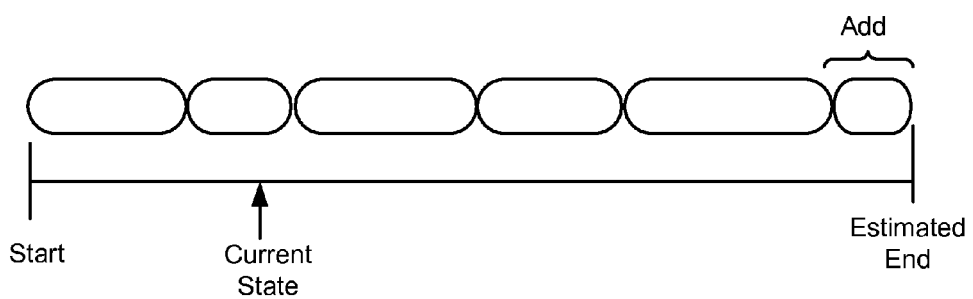

FIGS. 6A-6C show the concept of dynamically adjusting the prelap or drawdown to increase the estimated time as user interaction changes it. For example, consider that FIG. 6A shows (via the ovals) some set of selected clips that are initially stitched together to form a prelap or drawdown piece of music.

In FIG. 6B, the user has reached a current state relative to the target (e.g., the event) but has slowed down, such as a race car getting further from passing another car, e.g., because the other player accelerated or the user decelerated. The re-estimated time is thus longer than in the example of FIG. 6A. In FIG. 6B, the remaining audio clips may be stretched by increasing the bpm and thus making them shorter in actual time. However, if doing so is still not sufficient, another clip (or clips) may be added (FIG. 6C). As can be readily appreciated, replacement, stretching and/or adding clip(s) may be used alone or together to increase the time as needed.

FIG. 7 is a flow diagram showing example steps that may be used to implement a dynamically adjustable pre-cognition music system, beginning at step 702 where the user is playing the game but has not yet met the prediction criterion (or criteria). Step 704 represents testing for this state being reached. Note that many of the exemplified steps need not be performed in the order shown.

If the prediction criterion is met, step 706 estimates the time to the predicted event. Step 708 selects the audio tracks, which may be random, or partially random for the prelap. Note that step 708 represents the prelap, but the steps are generally the same for the drawdown, except that excitement/suspense goes down rather than up. Step 710 plays the selected audio.

If the event is reached, as evaluated by step 712, the exemplified process continues to FIG. 8. Otherwise, step 714 tests whether the maximum time has been reached; this may be done so that the user does not stay in the prelap stage too long, based on a likelihood that the user does not appear to be interested in reaching the event. If the maximum time is reached, the system switches to drawdown music at step 716.

Step 718 represents evaluating the user context for a change in the estimate. If changed, the process returns to step 706 to estimate the new time, and then select different clips and/or adjust parameters to obtain audio that meets the new desired time. Note that instead of looking for a change at step 718, the process may simply re-estimate the time by returning to step 706, e.g., on a regular basis.

Step 720 represents evaluating whether the user has exited the prediction, e.g., the user is no longer in the prediction zone; (as mentioned above, there may be different criteria for entering the zone versus leaving the zone). If so, the process returns to step 702 to again play the baseline loop.

FIG. 8 represents operations that may occur when an event is reached. For example, step 802 plays an event-triggered music loop, until the event completes (step 804). If the game is continuing (step 806), the process returns to play the event drawdown music. Otherwise other music (e.g., a loop) is selected at step 808 and played, e.g., based upon how the game completed.

As can be seen, prediction of an upcoming event may be used to dynamically put energy, build suspense and so forth into a musical score, or conversely draw down from the level of energy. This may be used for foreshadowing as is done in film, even though unlike film, the technology described herein may dynamically adapt to user input. Low tension, medium tension and high tension audio are among the many possibilities that a developer and composer can use in a videogame.

As the user approaches the event, the music builds anticipation, yet the system can adapt in real time as the time to target changes as decided by the user. Drawdown is also used to lower the anticipation and return seamlessly to other audio.

The use of random selection or pseudorandom selection also provides for a varied user experience. A user may get a different experience even if the state and user context are identical. For example, even if the time to an event is always the same, e.g., based upon gravity, the prelap or drawdown music may be different each time.

Aspects of the technology include predicting an estimated time to an event, in which an actual time to the event is determined by user interaction with a computing device, dynamically selecting audio based upon the estimated time, playing the audio, and dynamically adjusting the audio based upon interaction that changes the estimated time. Selecting the audio based upon the estimated time may comprise selecting audio clips based upon metric modulation. Selecting the audio clips may be performed at least partially randomly.

Selecting the audio may comprise selecting prelap music corresponding to moving toward the event; selecting the prelap music may comprise using harmonic modulation to increase at least one key in which the prelap music is played, over time.

Selecting the audio may comprise selecting drawdown music corresponding to a) moving away from the event, b) reaching a threshold time without reaching the event or c) completing the event. Selecting the drawdown music may comprise using harmonic modulation to decrease at least one key in which the drawdown music is played, over time.

Adjusting the audio may include changing a number of beats per minute. Selecting the audio and/or adjusting the audio may comprise using digital signal processing.

One or more aspects are directed towards a dynamic music generation processing component configured to select audio clips based upon current context data corresponding to an interactive user, including to estimate an estimated time to an upcoming event and select the audio clips based upon the estimated time to the upcoming event. The estimated time to the upcoming event may be based upon user context data that indicates that at least one prediction criterion is met.

The dynamic music generation processing component may include or be coupled to a metric modulation component that uses meter signatures of the selected audio clips to approximate or match the estimated time. The dynamic music generation processing component may include or be coupled to a harmonic modulation component that selects audio clips so as to increase or decrease at least one key at which the audio clips are played during playback of the audio clips. The dynamic music generation processing component may include or be coupled to a beats-per-minute float component that changes a rate of playing the audio clips to compress or stretch the playing time of the selected audio clips.

The dynamic music generation processing component may re-estimate the estimated time into a new estimated time and dynamically adjust the audio clips based upon the new estimated time. The audio clips may be dynamically adjusted by compressing at least one audio clip's playing time and/or by stretching at least one audio clip's playing time. The audio clips may be dynamically adjusted by replacing at least one audio clip, by dropping at least one audio clip, and/or by adding at least one audio clip.

One or more aspects are directed towards dynamically generating prelap music as an interactive user approaches an upcoming event, including determining an estimated time to reaching the event and selecting a length of the prelap music to approximate or meet the estimated time. Also described is outputting the prelap music for playing. One or more aspects are directed towards dynamically generating drawdown music as an interactive user moves away from the upcoming event or has reached and completed the event, along with outputting the drawdown music for playing.

One or more aspects are directed towards playing a first baseline audio loop until one or more prediction criteria are met that indicate that the interactive user is predicted to reach the upcoming event, and playing dynamically generated prelap music thereafter, and playing a second event baseline audio loop if the user reaches the upcoming event. The estimated time may be re-estimated based upon user interaction, with the prelap music or the drawdown music dynamically regenerated to correspond to the estimated time.

Example Operating Environment

It can be readily appreciated that the above-described implementation and its alternatives may be implemented on any suitable computing device/machine or similar machine logic, including a gaming and/or entertainment system/console, personal (e.g., laptop or desktop) computer, tablet, wearable computing device, companion device, appliance (e.g., television, DVR, set-top box), smartphone, standalone device and/or the like. Combinations of such devices are also feasible when multiple such devices are linked together. For purposes of description, a gaming (including media) system is described as one example operating environment hereinafter. However, it is understood that any or all of the components or the like described herein may be implemented in storage devices as executable code, and/or in hardware/hardware logic, whether local in one or more closely coupled devices or remote (e.g., in the cloud), or a combination of local and remote components, and so on.

Figure 9:
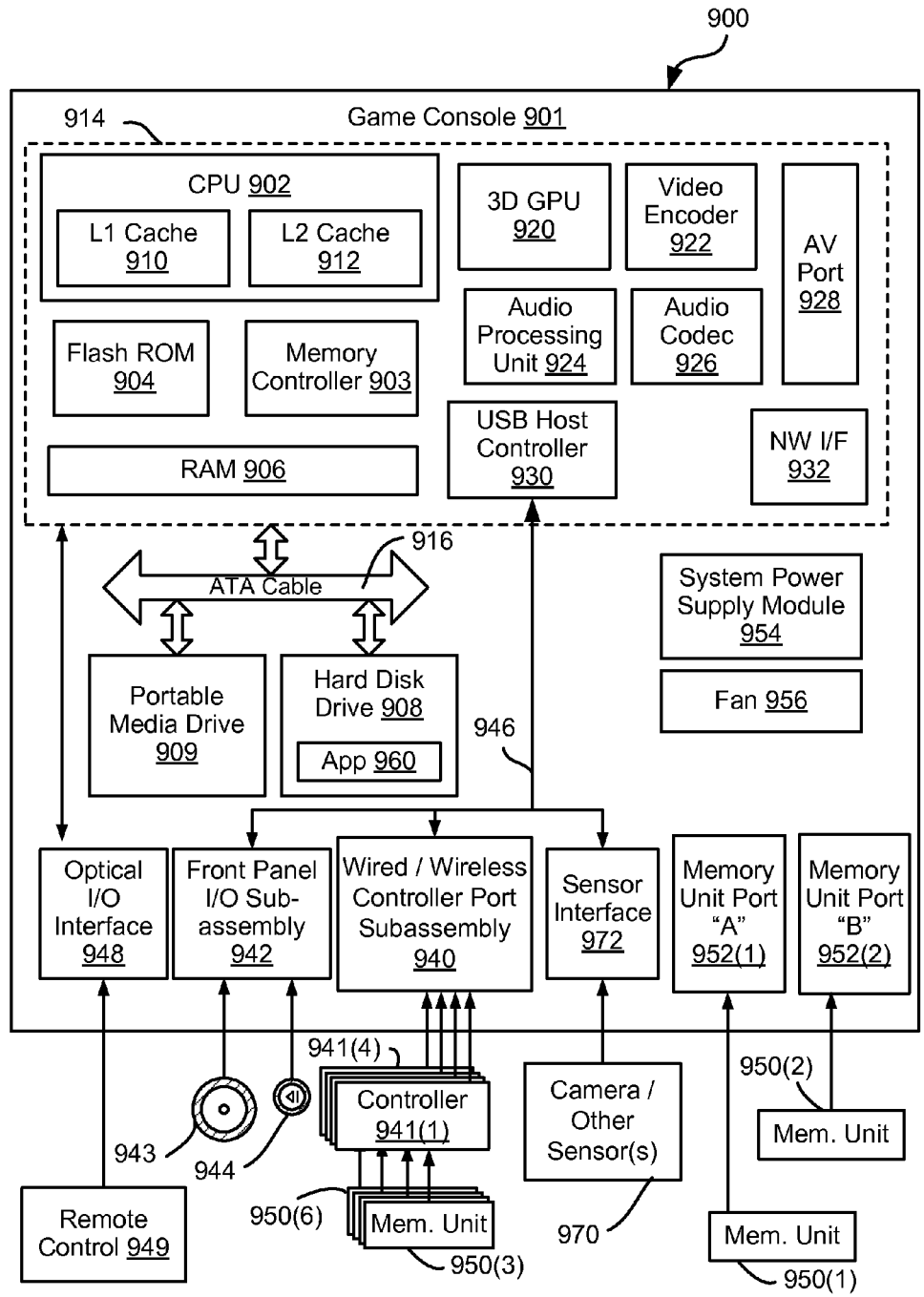
FIG. 9 is a block diagram representing an example non-limiting computing system and/or operating environment, exemplified as a gaming console, in which one or more aspects of various embodiments described herein can be implemented.

FIG. 9 is a functional block diagram of an example gaming and media system 900 and shows functional components in more detail. Console 901 has a central processing unit (CPU) 902, and a memory controller 903 that facilitates processor access to various types of memory, including a flash Read Only Memory (ROM) 904, a Random Access Memory (RAM) 906, a hard disk drive 908, and portable media drive 909. In one implementation, the CPU 902 includes a level 1 cache 910, and a level 2 cache 912 to temporarily store data and hence reduce the number of memory access cycles made to the hard drive, thereby improving processing speed and throughput.

The CPU 902, the memory controller 903, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 902, the memory controller 903, the ROM 904, and the RAM 906 are integrated onto a common module 914. In this implementation, the ROM 904 is configured as a flash ROM that is connected to the memory controller 903 via a Peripheral Component Interconnect (PCI) bus or the like and a ROM bus or the like (neither of which are shown). The RAM 906 may be configured as multiple Double Data Rate Synchronous Dynamic RAM (DDR SDRAM) modules that are independently controlled by the memory controller 903 via separate buses (not shown). The hard disk drive 908 and the portable media drive 909 are shown connected to the memory controller 903 via the PCI bus and an AT Attachment (ATA) bus 916. However, in other implementations, dedicated data bus structures of different types can also be applied in the alternative.

A three-dimensional graphics processing unit 920 and a video encoder 922 form a video processing pipeline for high speed and high resolution (e.g., High Definition) graphics processing. Data are carried from the graphics processing unit 920 to the video encoder 922 via a digital video bus (not shown). An audio processing unit 924 and an audio codec (coder/decoder) 926 form a corresponding audio processing pipeline for multi-channel audio processing of various digital audio formats. Audio data are carried between the audio processing unit 924 and the audio codec 926 via a communication link (not shown). The video and audio processing pipelines output data to an A/V (audio/video) port 928 for transmission to a television or other display/speakers. In the illustrated implementation, the video and audio processing components 920, 922, 924, 926 and 928 are mounted on the module 914.

FIG. 9 shows the module 914 including a USB host controller 930 and a network interface (NW I/F) 932, which may include wired and/or wireless components. The USB host controller 930 is shown in communication with the CPU 902 and the memory controller 903 via a bus (e.g., PCI bus) and serves as host for peripheral controllers 934. The network interface 932 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 9, the console 901 includes a controller support subassembly 940, for supporting at least four game controllers 941(1)-941(4). The controller support subassembly 940 includes any hardware and software components needed to support wired and/or wireless operation with an external control device, such as for example, a media and game controller. A front panel I/O subassembly 942 supports the multiple functionalities of a power button 943, an eject button 944, as well as any other buttons and any LEDs (light emitting diodes) or other indicators exposed on the outer surface of the console 901. The subassemblies 940 and 942 are in communication with the module 914 via one or more cable assemblies 946 or the like. In other implementations, the console 901 can include additional controller subassemblies. The illustrated implementation also shows an optical I/O interface 948 that is configured to send and receive signals (e.g., from a remote control 949) that can be communicated to the module 914.

Memory units (MUs) 950(1) and 950(2) are illustrated as being connectable to MU ports "A" 952(1) and "B" 952(2), respectively. Each MU 950 offers additional storage on which games, game parameters, and other data may be stored. In some implementations, the other data can include one or more of a digital game component, an executable gaming application, an instruction set for expanding a gaming application, and a media file. When inserted into the console 901, each MU 950 can be accessed by the memory controller 903.

A system power supply module 954 provides power to the components of the gaming system 900. A fan 956 cools the circuitry within the console 901.

An application 960 comprising machine instructions is typically stored on the hard disk drive 908. When the console 901 is powered on, various portions of the application 960 are loaded into the RAM 906, and/or the caches 910 and 912, for execution on the CPU 902. In general, the application 960 can include one or more program modules for performing various display functions, such as controlling dialog screens for presentation on a display (e.g., high definition monitor), controlling transactions based on user inputs and controlling data transmission and reception between the console 901 and externally connected devices.

As represented via block 970, a camera (including visible, IR and/or depth cameras) and/or other sensors, such as a microphone, external motion sensor and so forth may be coupled to the system 900 via a suitable interface 972. As shown in FIG. 9, this may be via a USB connection or the like, however it is understood that at least some of these kinds of sensors may be built into the system 900.

The gaming system 900 may be operated as a standalone system by connecting the system to high definition monitor, a television, a video projector, or other display device. In this standalone mode, the gaming system 900 enables one or more players to play games, or enjoy digital media, e.g., by watching movies, or listening to music. However, with the integration of broadband connectivity made available through the network interface 932, gaming system 900 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed at least in part on at least one processor, comprising:
dynamically generating prelap music as an interactive user approaches an upcoming event, including determining an estimated time to reaching the event and selecting a length of the prelap music to approximate or meet the estimated time;
outputting the prelap music for playing;
dynamically generating drawdown music as an interactive user reaches the event within threshold maximum time; and
outputting the drawdown music for playing, wherein the pre-lap music represents increasing excitement or suspense of the interactive user and the drawdown music represents decreasing excitement or suspense of the interactive user,
wherein the event is associated with playing a video game by the interactive user.

2. The method of claim 1, further comprising:
predicting an estimated time to an event, in which an actual time to the event is determined by user interaction with a computing device;
dynamically selecting audio based upon the estimated time;
playing the audio; and
dynamically adjusting the audio based upon interaction that changes the estimated time.

3. The method of claim 2 wherein selecting the audio clips is performed at least partially randomly or based upon metric modulation.

4. The method of claim 2 wherein adjusting the audio comprises changing a number of beats per minute.

5. The method of claim 2 wherein selecting the audio comprises selecting the prelap music corresponding to moving toward the event.

6. The method of claim 5 wherein selecting the prelap music comprises using harmonic modulation to increase at least one key in which the prelap music is played, over time.

7. The method of claim 2 wherein selecting the audio comprises selecting drawdown music corresponding to a) moving away from the event, b) reaching a threshold time without reaching the event or c) completing the event.

8. The method of claim 7 wherein selecting the drawdown music comprises using harmonic modulation to decrease at least one key in which the drawdown music is played, over time.

9. The method of claim 2 wherein selecting the audio, or adjusting the audio, or both comprises using digital signal processing.

10. A system comprising,
memory for storing audio clips; and
at least one processor programmed for:
dynamically generating prelap music as an interactive user approaches an upcoming event, including determining an estimated time to reaching the event and selecting a length of the prelap music to approximate or meet the estimated time,
outputting the prelap music for playing,
dynamically generating drawdown music as an interactive user reaches the event within threshold maximum time, and
outputting the drawdown music for playing, wherein the pre-lap music represents increasing excitement or suspense of the interactive user and the drawdown music represents decreasing excitement or suspense of the interactive user,
wherein the event is associated with playing a video game by the interactive user.

11. The system of claim 10, further comprising:
a dynamic music generation processing component executable by the at least one processor to select audio clips based upon current context data corresponding to an interactive user, including to estimate an estimated time to an upcoming event and select the audio clips based upon the estimated time to the upcoming event.

12. The system of claim 11 wherein the dynamic music generation processing component includes or is coupled to a harmonic modulation component, the harmonic modulation component configured to select audio clips so as to increase or decrease at least one key at which the audio clips are played during playback of the audio clips.

13. The system of claim 11 wherein the dynamic music generation processing component includes or is coupled to a beats-per-minute float component, the beats-per-minute float component configured to change a rate of playing the audio clips to compress or stretch the playing time of the selected audio clips.

14. The system of claim 11 wherein the dynamic music generation processing component re-estimates the estimated time into a new estimated time and dynamically adjusts the audio clips based upon the new estimated time.

15. The system of claim 14 wherein the dynamic music generation processing component dynamically adjusts the audio clips by compressing at least one audio clip's playing time or by stretching at least one audio clip's playing time.

16. The system of claim 14 wherein the dynamic music generation processing component dynamically adjusts the audio clips by replacing at least one audio clip, by dropping at least one audio clip, or by adding at least one audio clip.

17. The system of claim 1 wherein the dynamic music generation processing component estimates the estimated time to the upcoming event based upon user context data that indicates that at least one prediction criterion is met.

18. One or more machine-readable storage devices having executable instructions, for managing music, comprising:
dynamically generating prelap music as an interactive user approaches an upcoming event, including determining an estimated time to reaching the event and selecting a length of the prelap music to approximate or meet the estimated time;
outputting the prelap music for playing;
dynamically generating drawdown music as an interactive user reaches the event within threshold maximum time; and
outputting the drawdown music for playing, wherein the pre-lap music represents increasing excitement or suspense of the interactive user and the drawdown music represents decreasing excitement or suspense of the interactive user, and
wherein the event is associated with playing a video game by the interactive user.

19. The one or more machine-readable storage devices of claim 18 having further machine-readable instructions comprising, playing a first baseline audio loop until one or more prediction criteria are met that indicate that the interactive user is predicted to reach the upcoming event and playing the prelap music thereafter, and playing a second event baseline audio loop if the user reaches the upcoming event.

20. The one or more machine-readable storage devices of claim 18 having further machine-readable instructions comprising, re-estimating the estimated time based upon user interaction, and dynamically re-generating the prelap music or the drawdown music to correspond to the estimated time.

* * * * *